Patented Sept. 22, 1925.

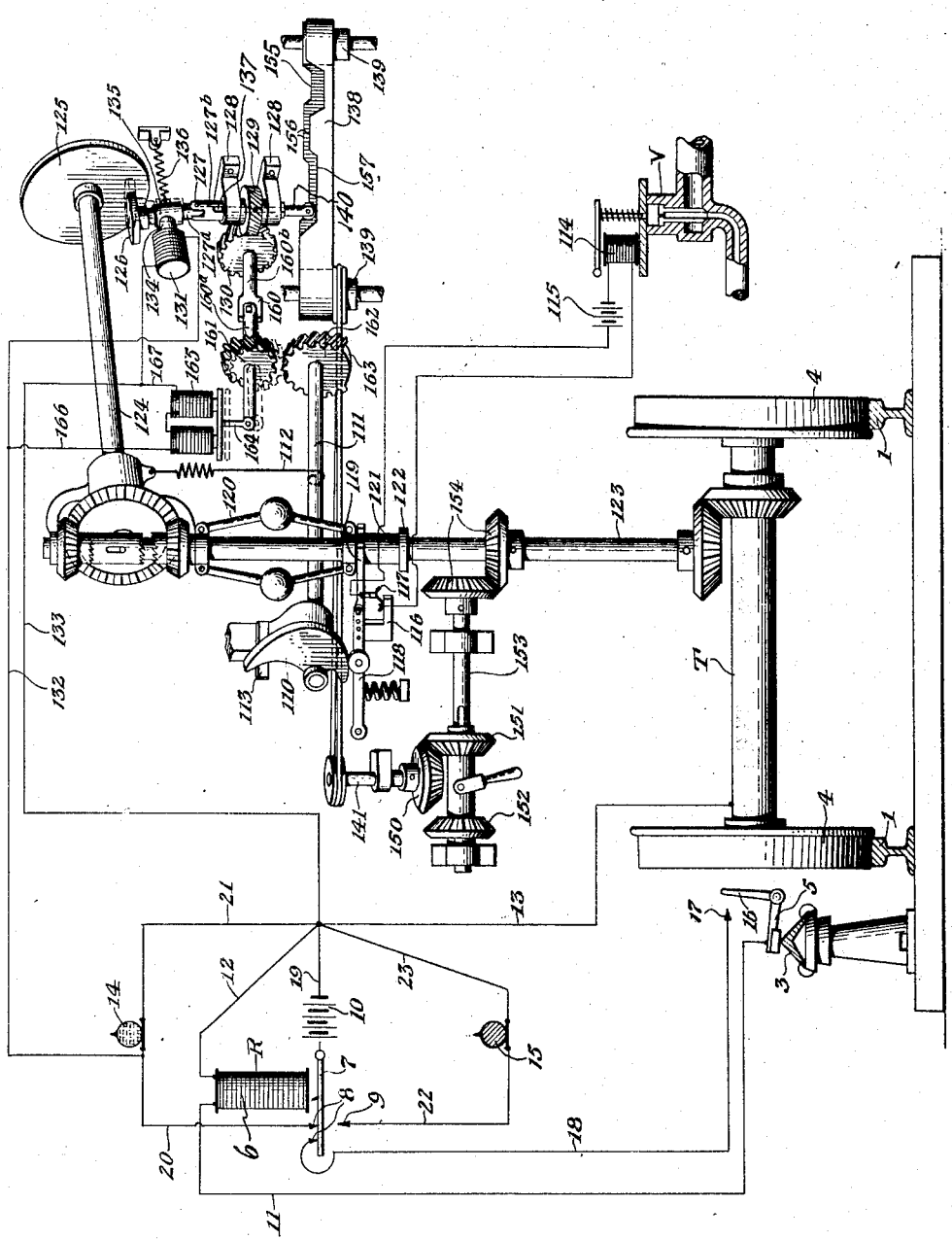

1,554,662

UNITED STATES PATENT OFFICE.

PAUL J. SIMMEN, OF EDEN, NEW YORK.

SPEED-CONTROL SYSTEM FOR VEHICLES.

Application filed June 5, 1922. Serial No. 566,205.

*To all whom it may concern:*

Be it known that I, PAUL J. SIMMEN, a citizen of the United States, residing at Eden, in the county of Erie and State of New York, have invented certain new and useful Improvements in Speed-Control Systems for Vehicles, of which the following is a specification.

This invention relates to speed control systems for vehicles and more particularly to mechanism for varying the rate of movement of the speed controlling cam.

The braking curve of the vehicle or train varies, of course, with grade conditions, being proportionately longer for down grades and proportionately shorter for up grades. Speed control systems of the general type to which the present invention relates embody a controlling element by which the speed of the vehicle can be regulated as desired and this controlling element, which is preferably a cam, has an outline and normal speed of movement calculated with reference to normal, that is to say level, grade conditions, whereby the speed reduction curve will conform to the normal braking curve. However, in order that this same conformity may be maintained on conditions of down or up grade it is necessary that the rate of movement of the controlling element be appropriately varied, the movement of said element being retarded for down grade conditions because of the greater length of the braking curve and being accelerated for up grade conditions because of the less length of the braking curve. By such regulation of the rate of movement of the controlling element it is possible to take the fullest advantage of track capacity while at the same time fully to conform to conditions of safe running.

The principal object of the invention is to provide for more accurate and certain regulation of the rate of movement of the speed controlling element whereby the speed reduction curve can be made to conform substantially and continuously with the braking curve at any point, or within any desired range or ranges, of the line of travel of the vehicle. A further object of the invention is to provide simple and reliable mechanism for the purposes stated.

With the above objects in view the invention consists generally in speed control mechanism having novel features of structure and combination which will appear as the description proceeds and which are concerned with the operation of the speed controlling element and with the automatic regulation of its rate of movement, so that whenever said element may be operated to regulate the speed in accordance with existing traffic conditions this operation will be such as to conform the speed reduction curve to the braking curve existing at the time.

The invention is illustrated in the accompanying drawing, the single feature of which illustrates the speed controlling mechanism in perspective and in its relation to the electrical equipment of the vehicle as shown diagrammatically.

In the drawing the speed controlling mechanism is assumed to be used in connection with cab signals by which clear or danger track way conditions are indicated. For the transmission of regulating currents I preferably use, in accordance with known practice, short third rails or ramps which are arranged adjacent the entrances to station or block divisions of the road. The track rails are shown at 1, the vehicle is indicated diagrammatically by the showing of the truck T and a short third rail or ramp is shown at 3. A simple arrangement of two lamp circuits such as is shown in my prior Patent No. 941,541 of November 30, 1909, has been selected for the purpose of illustration. The car carries a relay R which may be of any desired character and is used to control the operation of the signal lamps. The relay R as shown includes an ordinary magnet 6 and a pivoted armature 7 which moves against a front contact 8 when the magnet 6 is energized and against a back contact 9 when said magnet is de-energized. The magnet 6 is energized by current supplied through the third rails 3 or by current supplied from a suitable source, for example a battery 10 carried by the vehicle. The vehicle is also provided with a movable shoe 5 for engagement with the third rails 3 and when the shoe 5 is engaged with an electrified third rail current flows by the wire 11 to the magnet 6 and thence by the wires 12 and 13 to ground. When the shoe 5 is engaged with a de-energized third rail no current is supplied to the magnet 6. When the shoe 5 passes from an energized third rail current is supplied to the magnet 6 by the battery 10 and the energization of the magnet is thus continued until it is interrupted as will presently appear by the engagement of the shoe 5 with the de-energized third rail. When the shoe 5 passes from a de-energized third rail no current is supplied to the magnet which thus remains de-energized until such time as its energization is established by the engagement of the shoe 5 with an electrified third rail. When the magnet 6 is energized a clear signal is displayed and when the magnet 6 is de-energized a danger signal is displayed. the clear signal being given by a green lamp 14 and the danger signal being given by a red lamp 15.

One pole of the battery 10 is permanently connected to the armature 7 and said battery is in a normally maintained circuit which establishes the lighting of the clear signal lamp 14. Such circuit includes the magnet 6, the armature 7, the front contact 8 and the wires 11 and 12 and is completed by a suitable switch 16 movable with the shoe 5 and normally (i. e. when said shoe is not in engagement with a third rail) engaging a contact 17 connected by a wire 18 to the front contact 8. This circuit may be traced as follows: battery 10, armature 7, front contact 8, wire 18, contact 17, switch 16, shoe 5, wire 11, magnet 6, and wires 12 and 19 to battery. The circuit thus traced is broken at the contact 17 when the shoe 5 is in engagement with a third rail.

When the magnet 6 is energized another circuit is established for the lamp 14 and which may utilize the battery 10 or other suitable source. As shown the circuit for the lamp 14 may be traced from battery 10 through armature 7, front contact 8, wire 20, lamp 14, and wires 21 and 19 to battery.

When the magnet 6 is de-energized a circuit is established for the lamp 15 and which may utilize the battery 10 or any other suitable source. As shown the circuit for the lamp 15 may be traced from battery 10 through armature 7, back contact 9, wire 22, lamp 15, and wires 23 and 19 to battery.

It will be noted that the particular signal established in accordance with the condition of the third rail with which the shoe 5 is engaged is continued after the vehicle passes by the third rail and until the shoe 5 engages with a third rail having a different electrical condition. The third rail is formed in accordance with standard practice with inclined end portions (not shown) to facilitate the engagement of the shoe 5 and the parts are so arranged that the switch 16 will engage the contact 17 before the shoe 5 completely disengages the third rail. Consequently, in the case of an energized third rail, the energization of the magnet, effected through the circuit in which said rail is included, is uninterruptedly continued when the vehicle passes beyond the third rail by the local holding circuit which includes the battery 10 and the switch 16; and in this way the lighting of the lamp 14 to give a clear signal, as effected by the contact of the shoe 5 with an energized third rail, is continued until the shoe 5 engages a de-energized third rail at which time, the local holding circuit being broken at the contact 17, no current is supplied to the magnet 6.

When the magnet 6 is thus de-energized by the engagement of the shoe 5 with a de-energized third rail the armature 7 falls against the back contact 9 and closes the circuit of the lamp 15 thus producing the danger signal which is continued until the shoe 5 engages with an energized third rail, it being apparent that after the vehicle leaves the de-energized rail the local holding circuit of the magnet is broken at the contact 8 and that the armature 7 will remain in engagement with the contact 9 until such time as current is supplied to the magnet through an energized third rail.

The speed control system utilizes a controlling element, preferably a cam 110, which, as shown, reduces the speed of the vehicle from maximum to minimum under conditions of danger, but which by the employment of suitable mechanism, for example the mechanism shown in my pending application, Serial No. 481,281, can also be utilized to establish sub-maximum speeds, thereby to determine and limit the permissive maximum speed in accordance with changing track-way conditions and hazards. The cam 110 is mounted on an operating shaft 111 and is constantly subject to the action of a spring 112 which may be connected to said shaft and which moves the cam in a direction to permit the speed of the vehicle to be increased, such movement of the cam being limited by a stop pin 113. A train pipe release valve is illustrated at V and is operated by a magnet 114, the construction being such that the valve is closed so long as the magnet is energized but opens upon its de-energization. The magnet 114 is in circuit with the battery 115, the circuit having relatively movable terminal contacts 116 and 117. The contact 116 is secured to a pivoted arm 118 operated by the cam 110 and held by a spring in bearing engagement with said cam. The contact 117 normally bears as a spring on the contact 116 and is secured to a forked bar 119 which is pivoted at the end of the arm 118 and is operated by a centrifugal governor 120, the forked end of the bar 119 fitting over a sleeve 121 whose movement is effected by the weighted arms of the governor. The sleeve 121 is provided with a flange 122 which, at times, acts on the bar 119 to cause the separation of the contacts 116 and 117. The governor 120 is mounted on a shaft 123 which is driven from the wheels 4 by suitable gearing. It will be apparent that as the arm 118 is moved downward by the cam 110 the first effect will be the disengagement of the contacts 116 and 117 with resultant opening of the circuit of the valve V and operation of the said valve to set the brakes. It will also be apparent, assuming a lowered position of the arm 118, that the re-engagement of the contacts 116 and 117 will be effected only as the sleeve 121 moves downward proportionately to the movement of said arm, whereby the flange 122 will permit the bar 119 to assume its normal position relative to the arm 118.

The shaft 123 drives a countershaft 124 which in turn drives the cam shaft 111. According to the invention variable speed gearing is interposed between the countershaft 124 and the shaft 111 and means is provided to act on said gearing and thereby regulate the speed of the shaft 111 in order that the rate of movement of the cam 110 may be effected in accordance with existing grade conditions whatever they may be.

The variable speed gearing may, of course, be of any suitable construction for the purposes in view. As shown such gearing comprises a friction disk 125 mounted on the shaft 124, a friction wheel 126 which may engage and is driven by the disk 125 and a shaft 127 carrying the wheel 126 and which includes upper and lower sections 127$^a$ and 127$^b$. The upper section 127$^a$ is pivotally connected to the lower section 127$^b$ and may be rocked on its pivot in order that the wheel 126 may be engaged with or disengaged from the disk 125. The engagement of the wheel 126 with the disk 125 causes the cam shaft 111 to be driven from the shaft 124 and the disengagement of the wheel 126 from the disk 125 prevents the rotation of the shaft 111 from the shaft 124. The section 127$^b$ of the shaft 127 is mounted in suitable bearings 128 and carries a worm gear 129 which is in driving engagement with a similar worm gear 130. The movement of the wheel 126 toward and from the driving face of the disk 125 may be accomplished in any suitable manner, for example by a solenoid 131 which is connected by wires 132 and 133 in multiple across the wires 20 and 21. The plunger 134 of the solenoid 131 is provided with a bearing 135 for the shaft section 127$^a$. It will be obvious that when the circuit of the lamp 14 is closed whereby said lamp gives a clear signal the solenoid 131 will be energized and will maintain the wheel 126 disengaged from the disk 125 so that no operation of the shaft 111 takes place; but that when the circuit of the lamp 14 is open (the circuit of the lamp 15 being thereupon closed so that the danger signal is displayed) the solenoid 131 is de-energized and thus permits the wheel 126 to be engaged with the disk 125, such engagement being effected in any suitable manner or by any suitable means, for example by a spring 136 connected to the bearing 135, and causing the cam shaft 111 to be driven from the shaft 124. The gear 130 is mounted on a shaft 160 which is made in two parts 160$^a$ and 160$^b$ coupled together by a suitable universal joint whereby the part 160$^a$ may be raised or lowered. The shaft part 160$^a$ carries a gear 161 which, under conditions of danger, meshes with a gear 162 on the shaft 111, the gear 162 having a mutilation 163 which limits the rotation of the shaft 111 to an arc conforming to the extent of the cam 110. The shaft part 160$^a$ is suitably connected to the armature 164 of an electric magnet 165 which by wires 166 and 167 is bridged across the wires 132 and 133. The solenoid 131 and magnet 165 are thus energized and de-energized at the same time. When the magnet 165 is energized the gear 161 is lifted from engagement with the gear 162 and when said magnet is de-energized the gear 161 is permitted or caused to engage the gear 162. When the gear 161 is disengaged from the gear 162 the spring 112 restores the cam 110 to its normal position in which the vehicle is permitted to run at maximum speed. It is therefore apparent that the operation of the shaft 111 requires the simultaneous engagement of the wheel 126 with the disk 125 and of the gear 161 with the gear 162; that under clear or safe track-way conditions, as indicated by the lamp 14, the solenoid 131 and magnet 165 are both energized and there is no operation of the shaft 111 wherefore the cam 110 remains in its normal position to permit the operation of the vehicle at the maximum speed; but that under danger conditions, as indicated by the lamp 15, the solenoid 131 and magnet 165 are both de-energized and the shaft 111 is operated and thereby moves the cam 110 in order to reduce the speed of the vehicle to minimum or sub-maximum, according to the particular construction of speed control mechanism provided.

The speed of the shaft 111 as driven by the shaft 124 and consequently the rate of movement of the cam 110 is, of course, determined by the position of the wheel 126 with reference to the axial center of the disk 125, the location of the wheel 126 nearer to or further from said center producing proportionately slower or faster rotation of the shaft 111. For the purpose of varying the position of the wheel 126 with reference to the axial center of the disk 125 the shaft 127 is slidably mounted. Thus the section 127$^b$ of said shaft is slidably mounted in the bearings 128 and is slidably keyed to the worm gear 129 as indicated by the showing of the key-way 137.

The position of the wheel 126 with reference to the axial center of the disk 125 is controlled by suitable means which is driven from the wheel 4. As herein shown diagrammatically the controlling means may consist of an endless band 138 mounted on rollers 139 and having a profiled upper edge. The shaft 127 has suitably connected thereto a non-rotatable downward axial extension 140 provided at its lower end with a friction roller which engages the profiled edge of the band 138. The band 138 may be driven from the wheels 4 in any suitable manner. As shown one of the rollers 139 is suitably geared or otherwise connected to a shaft 141 provided with a bevel gear 150 which is engaged by either of opposed coupled gears 151, 152, slidably mounted on a countershaft 153 driven by bevel gearing 154 from the shaft 123. The coupled gears 151 and 152 in accordance with their selected engagement with the gear 150 determine the direction in which the band 138 moves and provide for the reversal of the movement of said band.

The profile of the band 138 or equivalent element is selected to conform to grade conditions along the line of travel. An intermediate level of this profile which may be assumed as the level 155 corresponds to portions of the line in which there are no grades. The higher levels, as 156, of the profile correspond to down grade portions of the line, the height of level increasing with the degree of grade and lower levels, as 157, correspond to up-grade portions of the lines, the depth of these levels increasing with the degree of the grade. When the extension 140 rides on the levels 155, the wheel 126 is, of course, positioned to effect the movement of the cam 110 at normal speed. When the extension 140 rides on any of the higher levels 156 the wheel 126 is moved proportionately nearer the center of the disk 125 and the movement of the cam 110 is proportionately retarded, thereby to cause the speed reduction curve to conform to the longer braking curve; and when the extension 140 rides in any of the lower levels the wheel 126 is moved proportionately further from the center of the disk 125 and the movement of the cam 110 is proportionately accelerated, thereby to cause the speed reduction curve to conform to the shorter braking curve.

It will be apparent that the rate of movement of the speed controlling cam is subject to continuous regulation and that the speed reduction curve may be regulated as desired within the limits imposed by the diameter of the disk 125 whereby the speed reduction curve commencing at any point in the line of travel will conform to the braking curve commencing at such point.

It will be understood that, while changes in grade are the principal conditions tending to produce variations between the speed reduction and braking curves, the invention is applicable in the case of any other roadway conditions which affect the extent of the braking curve.

It will also be understood that no specific description herein contained is intended to impose any limitation upon the scope of the appended claims or to be taken otherwise than for the purpose of exposition.

Having fully described my invention, I claim:

1. In a system of vehicle speed control, a speed controlling mechanism including an operating cam, variable speed driving means for said cam, and an element operating with the wheels of the vehicle for predeterminately influencing said driving means and thereby regulating the speed of said cam.

2. In a system of vehicle speed control, speed controlling mechanism including an operating cam, variable speed driving means for said cam, means operating with the wheels of the vehicle for predeterminately influencing said driving means and thereby regulating the speed of said cam, third rails at intervals along the line of travel, and means responsive to an electrified condition of a third rail for rendering said cam normally inoperative.

3. In a system of vehicle speed control, speed controlling mechanism including an operating cam, variable speed driving means for said cam, and a profiled element driven from the wheels of the vehicle for predeterminately influencing said driving means and thereby regulating the speed of said cam.

4. In a system of vehicle speed control, speed controlling mechanism including an operating cam, variable speed driving means for said cam including normally disengaged cam driving elements, means operating with the wheels for predeterminately influencing said driving means, thereby to regulate the speed of said cam, third rails at intervals along the line of travel, and means responsive to an electrified condition of a third rail for maintaining said variable speed elements and said cam driving elements normally disengaged.

5. In a system of vehicle speed control, speed controlling mechanism including an operating cam, variable speed driving means for said cam, and means continuously responsive to the movement of the vehicle for predeterminately influencing said driving means, thereby to regulate the speed of said cam.

6. In a system of vehicle speed control, speed controlling mechanism including an operating cam, variable speed driving means for said cam, means continuously responsive to the movement of the vehicle for predeterminately influencing said driving means, thereby to regulate the speed of said cam, third rails at intervals along the line of travel, and means responsive to an electrified condition of a third rail for rendering said cam normally inoperative.

7. In a system of vehicle speed control, speed controlling mechanism having an operating element whose rate of movement determines the extent of the speed reduction curve, and means carried by the vehicle and operative at all points of the line of travel for predeterminately regulating the rate of movement of said element.

8. In a system of vehicle speed control, speed controlling mechanism having an operating element whose rate of movement determines the extent of the speed reduction curve and means continuously responsive to the movement of the vehicle for predeterminately regulating the rate of movement of said element at every point along the line of travel.

9. In a system of vehicle speed control, speed controlling mechanism having an operating element whose rate of movement determines the extent of the speed reduction curve, and vehicle-carried means automatically operative at all points of the line of travel for predeterminately regulating the rate of movement of said element.

10. In apparatus of the character set forth, the combination with a vehicle, of a movable speed control element, and means for moving said element at a plurality of different rates of speed with respect to the speed of the vehcile and means driven by the vehicle for governing the first-mentioned means.

11. In apparatus of the character set forth, the combination with a vehicle, of a movable speed control element, means for moving said element at a maximum speed and at a minimum speed and at a plurality of speeds intermediate the maximum speed and the minimum speed and means continuously driven by the vehicle for determining the speed at which the permissible speed device is moved.

12. In an apparatus of the character set forth, the combination with a vehicle, of a movable speed control element, and means for moving said element at more than two different rates of speed with respect to the speed of the vehicle, said means including only a single circuit and a multiple branch thereof.

13. In an apparatus of the character set forth, the combination with a vehicle, of a movable speed control element, and means for moving said element at a maximum speed and at a minimum speed and at all possible intermediate speeds, said means including a single driving shaft, a single driven shaft and an intermediate shaft driven at various speeds.

14. In an apparatus of the character set forth, the combination with a vehicle, of a movable speed control element, and means for moving said element at a plurality of speeds, said means including a driving shaft, a driven shaft and an intermediate shaft driven at a plurality of speeds.

15. In an apparatus of the character set forth, the combination with a vehicle, of a movable speed control element, a rotatable shaft upon which said element is fixedly mounted, a rotatable shaft driven by the vehicle, a disk fixedly mounted upon the second mentioned shaft, a second disk having its periphery bearing against the face of the first-mentioned disk, means for positioning the second-mentioned disk nearer to or farther away from the second-mentioned shaft, and means for connecting the second-mentioned disk to the first-mentioned shaft whereby said shaft is driven at various speeds.

16. In a system of vehicle speed control, in combination, a movable speed control element, means for moving said element at a plurality of speeds, a belt driven by the vehicle, said belt having one edge formed into depressions and elevations of an extent corresponding to down grades and up grades, and means co-operating with said belt governing the first-said means.

In testimony whereof I affix my signature.

PAUL J. SIMMEN.